US011872666B2

(12) United States Patent
Chen

(10) Patent No.: US 11,872,666 B2
(45) Date of Patent: Jan. 16, 2024

(54) MACHINE TOOL LEVELING ADJUSTMENT DEVICE

(71) Applicant: National Chin-Yi University of Technology, Taichung (TW)

(72) Inventor: Shao Hsien Chen, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 576 days.

(21) Appl. No.: 17/143,868

(22) Filed: Jan. 7, 2021

(65) Prior Publication Data

US 2022/0212305 A1 Jul. 7, 2022

(51) Int. Cl.
*B23Q 1/25* (2006.01)
*B23Q 17/22* (2006.01)
*B23Q 1/00* (2006.01)

(52) U.S. Cl.
CPC ....... *B23Q 17/2233* (2013.01); *B23Q 1/0054* (2013.01); *B23Q 1/25* (2013.01); *B23Q 2717/00* (2013.01)

(58) Field of Classification Search
CPC ..... B23Q 17/2233; B23Q 1/0054; B23Q 1/25
See application file for complete search history.

(56) References Cited

U.S. PATENT DOCUMENTS

| 4,626,299 A * | 12/1986 | Knight | B24B 41/02 384/42 |
| 4,965,964 A * | 10/1990 | Di Camillo | B24B 9/06 451/280 |
| 2009/0302517 A1* | 12/2009 | Patel | B25B 1/2484 269/71 |

* cited by examiner

*Primary Examiner* — Nathaniel C Chukwurah
(74) *Attorney, Agent, or Firm* — MUNCY, GEISSLER, OLDS & LOWE, P.C.

(57) ABSTRACT

A leveling adjustment device attached to a machine tool with supporting foot portions being adjusted manually to change a height, which includes a sensing module and a microcontroller unit. The sensing module senses the machine tool for inclined extents in two directions perpendicular to each other and then generates a sensed data. The microcontroller unit receives the sensed data and provides a graphical operation interface with first blanks and second blanks. The first blanks are used to fill with a length and width data of the machine tool while the second blanks are used to fill with a coordinate data corresponding to each of the supporting foot portions. The microcontroller unit calculates an adjustment sequence and an adjustment value corresponding to each of the supporting foot portions based on the data in the first and second blanks in conjunction with the sensed data and then displays in the graphical operation interface.

2 Claims, 1 Drawing Sheet

MACHINE TOOL LEVELING ADJUSTMENT DEVICE

BACKGROUND OF THE INVENTION

1. Technical Field

The present invention relates to a machine tool and more particularly to a leveling adjustment device for a machine tool.

2. Description of Related Art

Accuracy of cutting applied to extremely tiny objects is easily affected by whether the machine tool is horizontal or not, so that the inclination of the machine tool must be kept in tolerance. A level gauge is usually put on the machine tool to show the extent of inclination, and thus supporting feet of the machine tool are adjusted accordingly to raise a lower side or to lower a higher side for a purpose of leveling.

A machine tool which is only adjusted manually, however, has a plurality of adjustable supporting feet located in different positions. After inclination of the machine tool is measured, it is still necessary to consider which supporting foot is going to be adjusted. Besides, the machine tool may incline in both a longitudinal direction and a lateral direction so that leveling adjustment must be repeated twice.

BRIEF SUMMARY OF THE INVENTION

The primary objective of the present invention is to provide a machine tool leveling adjustment device that automatically measures and calculates how many distances each of the supporting feet of a machine tool has to be adjusted and then displays the value on a graphical operation interface for user to review and quickly adjust each of the supporting feet accordingly.

To achieve the above objective, the present invention provides a leveling adjustment device attached to a machine tool with a plurality of supporting foot portions being adjusted manually to change a height. The leveling adjustment device includes a sensing module and a microcontroller unit. The sensing module is used to sense the machine tool for one inclined extent in a longitudinal direction and another inclined extent in a lateral direction and then generate a sensed data. The microcontroller unit receives the sensed data and provides a graphical operation interface with a plurality of first blanks and a plurality of second blanks. The first blanks are used to fill with a data about a length and a width of a bottom of the machine tool while the second blanks are used to fill with a data about a quantity of the supporting foot portions and a data about a coordinate corresponding to each of the supporting foot portions. Based on the data in the second blanks, the graphical operation interface generates a plurality of third blanks within the frame pattern to represent a location of each of the supporting foot portions. A plurality of fourth blanks corresponding to the third blanks is also generated. The microcontroller unit calculates an adjustment sequence and an adjustment value corresponding to each of the supporting foot portions based on the data in the first and second blanks in conjunction with the sensed data and then displays in the fourth blanks.

The sensing module preferably includes a first electronic level set along the longitudinal direction and a second electronic level set along the lateral direction.

DETAILED DESCRIPTION OF THE INVENTION

Figure 1:
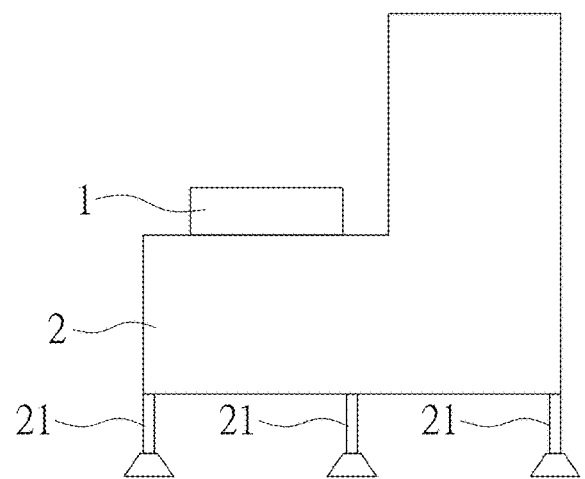
FIG. 1 is a plan view of the present invention.
Figure 2:
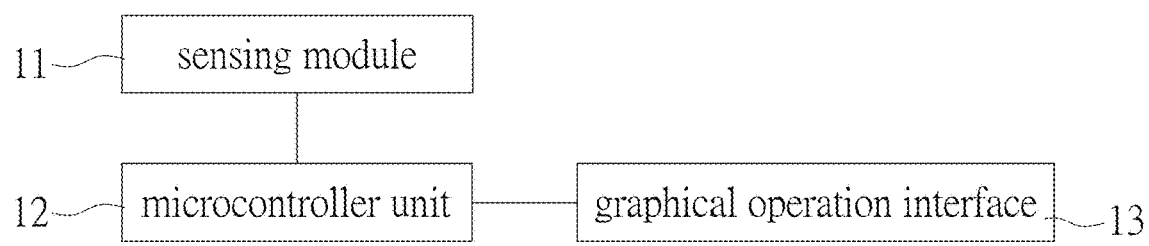
FIG. 2 is a block diagram showing the present invention.

Referring to FIG. 1 and FIG. 2, the leveling adjustment device 1 is attached to a machine tool 2 with a plurality of supporting foot portions 21 being adjusted manually to change a height. Machine tool that is adjusted automatically by automatic machine is excluded. The supporting foot portions 21 abovementioned can be adjusted in any known manners.

The leveling adjustment device 1 includes a sensing module 11 having a first electronic level (not shown in the Figures) set along a longitudinal direction of the machine tool 2 and a second electronic level (not shown in the Figures) set along a lateral direction of the machine tool 2. The first electronic level is configured to sense an extent of inclination of the machine tool 2 in the longitudinal direction while the second electronic level is configured to sense an extent of inclination of the machine tool 2 in the lateral direction. Therefore, the sensing module 11 generates a sensed data.

The leveling adjustment device 1 further includes a microcontroller unit 12, or MCU, that is a microcomputer integrating a central processing unit, memory, timer/counter, various input and output interfaces, etc. on an integrated circuit chip. The microcontroller unit 12 is electrically connected with the sensing module 11 to receive the sensed data.

Figure 3:
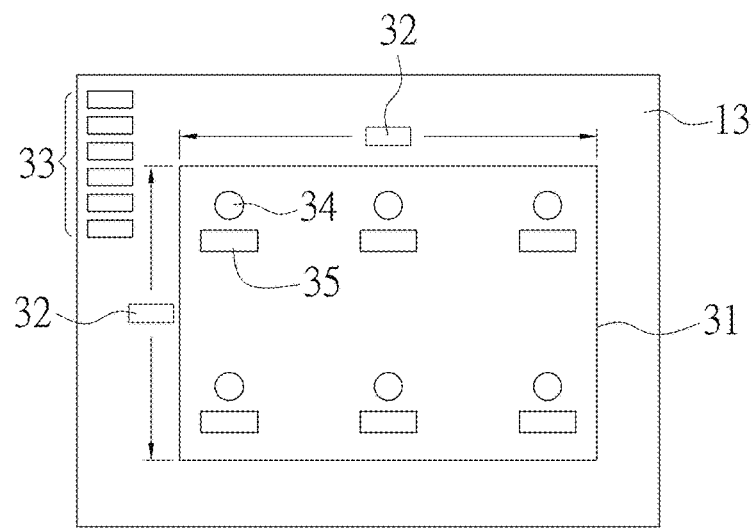
FIG. 3 shows the graphical operation interface of the present invention.

The microcontroller unit 12 provides a graphical operation interface 13 as shown in FIG. 3. The graphical operation interface 13 has a frame pattern 31 representing an outline of a bottom of the machine tool 2 with a coordinate system. Each of the two sides of the frame pattern 31 is provided with a first blank 32 to be filled with a data about a length and a width of the bottom of the machine tool 2. The graphical operation interface 13 is further provided with a plurality of second blanks 33 to be filled with a data about a quantity of the supporting foot portions 21 and a data about a coordinate corresponding to each of the supporting foot portions 21.

After keying the data into the first and second blanks 32, 33, the graphical operation interface 13 generates a sized frame pattern 31 and a plurality of third blanks 34 within the frame pattern 31 to represent locations of each of the supporting foot portions 21. A plurality of fourth blanks 35 corresponding to the third blanks 34 is also generated. Each of the fourth blanks 35 is located below the corresponding third blanks 34.

Based on the sensed data obtained by the sensing module 11 (which includes inclination data in both the longitudinal and lateral directions) along with the data filled in the first blanks 32 and the second blanks 33 (which includes the size of the machine tool 2 and the positions of the supporting foot portions 21), the microcontroller unit 12 calculates an adjustment sequence and an adjustment value corresponding to each of the supporting foot portions 21 for reaching level and then displays in the fourth blanks 35.

The present invention is advantageous in that leveling adjustment is quickly and easily done by putting the leveling adjustment device 1 on the machine tool 2 and adjusting the supporting foot portions 21 according to the adjustment sequence and the adjustment value displayed in the fourth blanks 35.

What is claimed is:

1. A leveling adjustment device attached to a machine tool with a plurality of supporting foot portions being adjusted manually to change a height, comprising:

a sensing module configured to sense the machine tool for one inclined extent in a longitudinal direction and an another inclined extent in a lateral direction and then generate a sensed data; and a microcontroller unit electrically connected with the sensing module and receiving the sensed data, the microcontroller unit providing a graphical operation interface having a frame pattern, representing an outline of a bottom of the machine tool, with a coordinate system, the graphical operation interface providing a plurality of first blanks to be filled with a data about a length and a width of the bottom of the machine tool and a plurality of second blanks to be filled with a data about a quantity of the supporting foot portions and a data about a coordinate corresponding to each of the supporting foot portions, the graphical operation interface generating, based on the data in the second blanks, a plurality of third blanks within the frame pattern to represent a location of each of the supporting foot portions and a plurality of fourth blanks corresponding to the third blanks, the microcontroller unit calculating an adjustment sequence and an adjustment value corresponding to each of the supporting foot portions based on the data in the first blanks and the second blanks in conjunction with the sensed data and then displaying in the fourth blanks.

2. The leveling adjustment device of claim 1, wherein the sensing module includes a first electronic level set along the longitudinal direction and a second electronic level set along the lateral direction.

* * * * *